United States Patent
Henehan

(10) Patent No.: US 6,598,111 B1
(45) Date of Patent: Jul. 22, 2003

(54) BACKPLANE PHYSICAL LAYER CONTROLLER

(75) Inventor: Burke Henehan, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 477 days.

(21) Appl. No.: 09/666,023

(22) Filed: Sep. 19, 2000

(51) Int. Cl.[7] .................. G06F 3/00; G06F 13/38; G06F 13/12; G06F 12/00; G06F 12/02
(52) U.S. Cl. .............. 710/313; 710/107; 710/15; 710/16; 710/62; 711/202
(58) Field of Search ................. 710/107, 313, 710/15, 16, 62; 711/202

(56) References Cited

U.S. PATENT DOCUMENTS 4,736,290 A * 4/1988 McCallion ............ 711/202
5,577,050 A * 11/1996 Bair et al. ............ 714/710
6,185,622 B1 * 2/2001 Sato .................... 709/233

OTHER PUBLICATIONS

*TSB14C01A, TSB14C01A1, TSB14C01AM 5V IEEE 1394–1995 Backplane Transceiver/Arbiter*, Texas Instruments, Inc. SGLS 107A—Feb. 1999—Revised Nov. 1999.

*IEEE 1394a Features Supported by TI TSB41LV0x Physical Layer Devices*—Texas Instruments Application Report: SLLA019, Mixed Signal Logic Products BuS Solutions Group, Dec. 1998.

"Validation of a Link Layer Synthesizable Core—a prototyping case study", Prasad, P.G., Rapid System Prototyping, 2000. Proceedings. 11th International Workshop. pp. 208–213.*

* cited by examiner

Primary Examiner—Glenn A. Auve
Assistant Examiner—Trisha Vu
(74) Attorney, Agent, or Firm—J. Dennis Moore; W. James Brady III; Frederick J. Telecky, Jr.

(57) ABSTRACT

A system includes a serial bus 330, at least a first portion of which is formed on a circuit board. A first physical layer controller 322 is coupled to the first portion of serial bus 330. This physical layer controller 322 includes a register set with a plurality of eight-bit registers addressable by four-bit addresses. In this device, at least one of the seventh or eighth bits of the 0010 register is permanently programmed with a logical "1". This physical layer controller is also backward compatible with a physical layer controller that conforms with IEEE-Std-1394-1995. The system also includes another physical layer controller 324, which may or may not be the same as physical layer controller 322, link layer controllers 314 and 316 and at least one processor (or controller) 310.

22 Claims, 2 Drawing Sheets

BACKPLANE PHYSICAL LAYER CONTROLLER

FIELD OF THE INVENTION

This invention relates generally to semiconductor devices and systems and specifically to backplane physical layer controllers.

BACKGROUND OF THE INVENTION

Electronic systems include a number of components that perform various functions. These components must be interconnected either by connecting individual components together and/or by connecting groups of components to a bus. Numerous varieties of buses can be used in systems utilizing a bus to connect components. For example, a parallel bus would include more than one data line so that multiple bits of data can be transferred simultaneously. In a serial bus, a single data line is used to carry data between devices sometimes in conjunction with a line to carry the clock signal.

One type of serial bus is specified by IEEE-Std-1394-1995. See *IEEE Standard for a High Performance Serial Bus*, Institute of Electrical and Electronics Engineers, Aug. 30, 1996. This standard describes a high-speed, low-cost serial bus suitable for use as a peripheral bus or as a secondary control backup to parallel back-plane buses. This standard is hereby incorporated herein by reference.

FIG. 1 shows a system block diagram for a single node on a backplane bus system 10. As shown in the figure, 1394 link layer controller 12 is coupled to a host interface and provides digital data to a 1394 physical layer controller 14. The 1394 physical layer controller 14 provides the signaling for the 1394-compliant bus to transceiver 16. The transceiver 14 is coupled to the bus (not shown). A 1394 backplane physical layer controller 14 is available from Texas Instruments Incorporated as part number TSB14C01A, which is described by the data sheet entitled "TSB14C01A, TSB1401AI, TSB14C01AM 5-V IEEE 1394-1995 Backplane Transceiver/Arbiter", Texas Instruments Incorporated, 1999, pp. 1–30, which is incorporated herein by reference.

SUMMARY OF THE INVENTION

In one specific embodiment, the present invention is related to a later version 1394 backplane physical layer controller that can be used to replace the TSB14C01A device. In particular, this specific embodiment includes a register set that allows software written for the previous generation 14C01A to be used with no changes, while also allowing new functionality to be implemented in a software transparent way. This involves designating a particular bit that can be set to a logical "1" so that a user can determine whether the later version device is present in the system, or more typically so that software developed for a particular application can determine whether the later version device is present in the system.

In one aspect, the present invention discloses a method of determining whether a semiconductor device comprises a first version device or a second version device. In the preferred embodiment, both the first version device and the second version device include a register set with a plurality of registers. In the first version device, one of the registers is accessible by a first address and includes at least one reserved bit. In addition, the first version device is decoded in such a manner that reading from a second address nonetheless causes reading from the accessible register. To determine whether the first or second version device is present, the second address is used to read from the reserve bit location. If the bit that is read in is a logical 37 1", one can determine that the semiconductor device comprises a second version device and take advantage of it's expanded capabilities If the bit is read as a logical "0", the original version part is present and only the older functionality may be accessed.

In one particular implementation relating to backplane physical layer controllers, the device includes a plurality of eight-bit registers. These registers are decoded by four-bit addresses. At least one of the seventh or eighth bits of the register addressed by the four-bit address "0010" is permanently programmed with a logical 37 1". This bit(s) can be used to differentiate between the original and later version devices while not affecting operation of software that only comprehends the original version device.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

Figure 1:
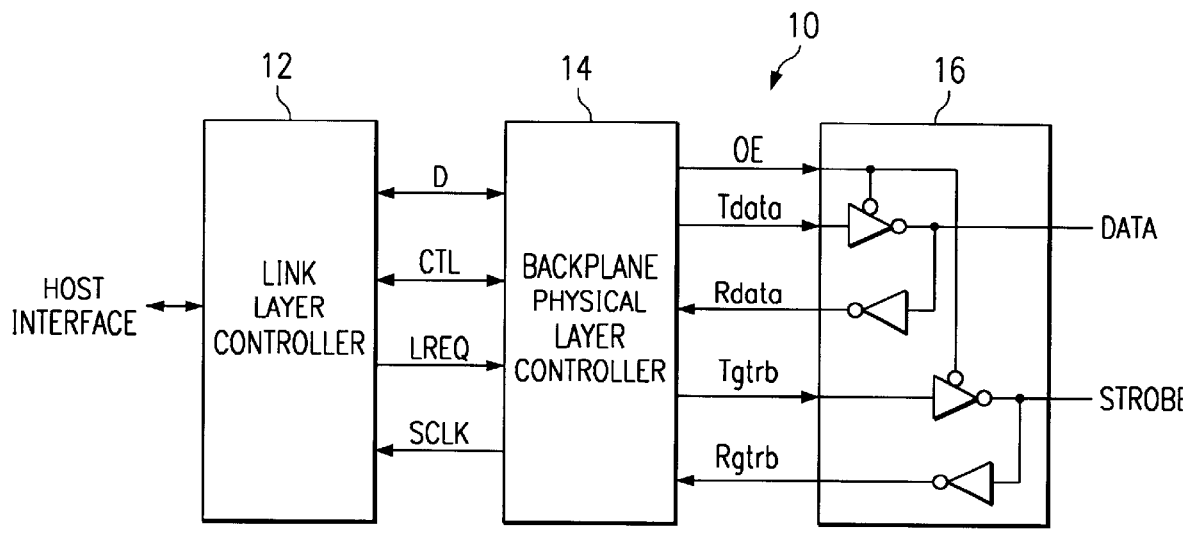
FIG. 1 is a block diagram of a known 1394 link layer and 1394 backplane physical layer.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention will be described in the context of a specific example. This example relates to backplane physical layer controller or PHY, specifically those compliant with IEEE-Std-1394. In one aspect, the present invention provides a technique to distinguish new version devices from older version devices. As will be clear, this same technique can be applied to devices other than backplane physical layer controllers.

A prior art backplane physical layer controller is the TSB14C01A, available from Texas Instruments Incorporated. This device includes a register set with a number of eight bit registers addressable using a four bit address. The accessible internal registers of this device are listed in Table 1.

TABLE 1

| Address | Bit Contents | | | | | | | |
|---|---|---|---|---|---|---|---|---|
| | 0 | 1 | 2 | 3 | 4 | 5 | 6 | 7 |
| 0000 | Physical ID[0] | Physical ID[1] | Physical ID[2] | Physical ID[3] | Physical ID[4] | Physical ID[5] | Reserved | Reserved |
| 0001 | INHB | IBR | | | | RESERVED | | |
| 0010 | | | | UNDOCUMENTED | | | | |
| 0011 | | | | RESERVED | | | | |
| 0100 | Priority level[0] | Priority level[1] | Priority level[2] | Priority level[3] | | RESERVED | | |

The register addressable by "0010" is listed as "UNDOCUMENTED" because the data sheet by the manufacturer does not include any documentation of this register (since it is not to be used). The functions of the various bits are described below with respect to Table 2, which shows the internal register set for the preferred embodiment physical layer controller which is backward compatible with the device of Table 1.

A shown in Table 2, the backplane PHY register map is backwards compatible with the existing TSB14C01A register set. It is noted, however, that it is not compliant with the 1394a draft specification as it exists at the time of initial filing of this patent application. Those features that are not compliant are bit 7 of address "0000", bits 6 and 7 of register "0010", all of register "0011" and register 0101, 0110, and 0111.

by bus reset (IBR, IRBR) and state machine reset (SMRST). It shall be reinitialized to the external pin values by a hardware reset or reset initiated by writing to the software initiated hard reset (SWHRST) bit.

CM (1, R/W). Cycle master. This bit is readable and write-able. The value of this bit does not affect the operation of the PHY, it is present in the backplane PHY register map for the sake of compatibility with some link designs which do not operate as cycle master unless this bit is set to one. In a backplane implementation that does not use isochronous traffic this bit has no effect. In backplane implementations that use a link that does not require the PHY "root" bit to be set to be cycle master, this bit may have the effect of enabling multiple "root" nodes. For this reason this bit should only be set on one node on a 1394 backplane bus. In those cases where a link does require this bit to be set before enabling the isochronous cycle master functionality, on a

TABLE 2

| Address | Bit Contents | | | | | | | |
|---|---|---|---|---|---|---|---|---|
| | 0 | 1 | 2 | 3 | 4 | 5 | 6 | 7 |
| 0000 | | | PHYSICAL_D | | | | CM | 14CEN |
| 0001 | TD | IBR | | | RESERVED | | | |
| 0010 | | LAST_ARB_WON_PHYSICAL_ID | | | | | RESERVED | E |
| 0011 | RDATA | RSTRB | XFR_SPD | | E_REGISTER_COUNT | | | |
| 0100 | | PRIORITY | | | | RESERVED | | |
| 0101 | | PRODUCT IDENTIFIER | | | | RESERVED FOR TEST | | |
| 0110 | EBLREQ | IRBR | SMRST | SWHRST | LAST_ARB_WON_PRIORITY | | | |
| 0111 | DDLS | DSLS | ENDLS | RESERVED | TDATA | TSRTB | TDOE* | OCDOE* |
| 1000 | STPCLK | | | RESERVED FOR TEST | | | | |
| 1001 | | | | RESERVED FOR TEST | | | | |

The following paragraphs describe the registers in the register set.

RESERVED. All fields marked as reserved shall be read as "0". Whenever software is written that writes to a register that has a reserved field, software shall write a binary zero (0) to each reserved bit. In this way a bit can be added later with the default value of 0 that reverts to previous functionality. Whenever a read is done of a register that has reserved fields, software shall not depend on the reserved fields to hold any particular value.

RESERVED FOR TEST. All fields marked as reserved for test may assume any value. When written to these fields shall be written with a binary zero (0). During any read the contents of a reserved_for_test field shall not be depended upon to have any particular value.

PHYSICAL_ID (6, R/W). Physical-ID. Physical layer ID for this node. Unlike the equivalent field in the cable environment, the physical ID in the backplane environment is write-able. The power-up state of this field is 000000b. The hardware reset state of this field shall be the binary state of the External ID pins on the device. This field is unaffected single node on the bus, the link must write a "1" to this bit. The power-up state of this field is 0b. If an external CM bit pin is implemented, this bit shall assume the value of that pin after a HW reset or after the SWHRST bit is set. This bit shall not be affected by a bus reset or state machine reset.

14CEN (1, R/W). 14C01A compatible enable. If set to one this sets the PHY to operate in 14C01A compatible arbitration mode. In this mode the PHY checks both when driving a "0" or a "1" during arbitration. When this bit is set to "0" (default state) the PHY only checks when driving a logical "0" during arbitration. There are no know cases where operating with this bit set to a 0 will cause any operational differences to the arbitration of the 14C01. It also allows one complete register to have all its bits both readable and write-able for testing purposes. The power-up state, state after HW reset, or SWRST reset of this field is 0b. The state of this bit is not affected by bus resets or state machine reset.

TD (1, R/W). Transceiver disable. When set to one the PHY shall set the output enable signals such that the bus transceivers are disabled. The 14aa1 will ignore any link layer service actions that would require a change to this bus output state. The power-up state of this field is 0b. The state of this bit is not affected by bus resets.

IBR (1, R/W). Initiate bus-reset. When set to one, the PHY shall initiate a bus reset immediately (without arbitration). This bit causes assertion of the reset signal for approximately 8 µs and is self-clearing. The IBR bit may be used to initiate bus resets when open collector transceivers are implemented. In general the IRBR bit should be used to initiate bus resets. When tri-state able transceivers are implemented, the IRBR bit must be used to initiate bus resets. The power-up state of this field is 0b.

LAST_ARB_WON_PHYSICAL_ID (6, R). Last Physical layer Node ID that Won Arbitration. This field shall contain the physical ID of the node that last won the arbitration phase on the bus. This field is only valid when the E bit is one "1b". This field is supplied for system debug purposes. The power-up state of this field is 000000b. The state of these bits is not affected by bus resets.

E (1, R). This bit is set to one to signify additional extended registers beyond address 0010b are implemented. When this bit is set to one the values in the LAST_ARB_WON_PHYSICAL_ID, LAST_ARB_WON_PRIORITY, RDATA, RSTRB, TDATA, TSTROBE, TDOE*, OCDOE* fields are valid. When this bit is zero the values in these fields are not valid. The power-up state of this field shall be 1b. This bit will always be read in a 14aa1 as a 37 1". This bit is always be read in a 14C01A as a"0".

RDATA (1, R). Received Data line state. When the Enhanced (E) bit is one, the sampled and latched line state read from this field is valid. This bit reads 37 1" for a data bit 37 1" (logical "1") received by the 14aa1 and "0" for a data bit "0" (logical "0"). The power-up state of this field is 0b. This bit is updated on a "best effort" basis. It is not required to be toggled with every change of its namesake's input pin. As a goal it shall be updated at least every 9 SCLKs, the length of the register read LREQ.

RSTRB (1, R) Received Strobe line state. When the Enhanced (E) bit is one, the sampled and latched line state read from this field is valid. This bit reads 37 1" for a strobe line "1" (logical "1") received by the 14aa1 and "0" for a strobe line "0" (logical "0"). The power-up state of this field is 0b. This bit is updated on a "best effort" basis. It is not required to be toggled with every change of its namesake's input pin. As a goal it shall be updated at least every 9 SCLKs, the length of the register read LREQ.

XFR_SPD (2, R). Transfer Speed. These bits shall map exactly to the CLK_SEL0 and CLK_SEL1 pins (CLK_SEL0 is left most bit, CLK_SEL1 is right most bit). This will enable software to verify the state of those pins and therefore the performance level of the bus transfers. Either 100 Mbps, 50 Mbps, or 25 Mbps. Please see the definitions for CLK_SEL0 and CLK_SEL1 for decoding. The state of these bits is not affected by bus resets or state machine resets. Upon power-up, HW reset, or SWHRST reset these bits shall be reloaded with the values from the CLK_SEL0 and CLK_SEL1 pins.

E_REGISTER_COUNT (3, R). Enhanced Register Count. When the Enhanced register map (E) bit is one, this field is valid. This field is set to 0101b to signify that there are five register addresses implemented above 0010b. The power-up state of this field is 0101b. PRIORITY (4, R/W). Priority Setting. This field shall contain the priority used in the arbitration process and shall be transmitted as the "PRI" field in the packet header. The power-up state of this field is 0000b. Bit field 0 maps to priority [0] the most significant bit of the priority field used during arbitration. The HW or SWHRST reset state of this field is the binary state of the External Priority pins on the device. The state of these bits is not affected by bus resets or state machine reset. When this field in non-zero the 14aa1 shall use urgent arbitration even when a "fair" request is made of the PHY by the link. When this field is zero the PHY will only use "fair" arbitration unless the link makes an urgent request using an 11-bit LREQ, if this device is configured to accept 11-bit LREQs.

PRODUCT IDENTIFIER (4, R). Product Identifier. This field contains the product identifier for the part. For the 14aa1 this bit shall be a binary 0000. Bits 0–3 are used to indicate functional changes to the design. The reserved for test bits at the same byte address shall be revision changes that did not affect customer functionality (testability, yield, process, etc; a die rev field) The power-up state of this field for the 14aa1 shall be 0000b. A decode table shall be included in the data sheet to show mapping to released TI part numbers.

DDLS (1, R/W). Drive Data Line State. When the Enable Manufacturing Test Output Drivers (M_TEST) pin is asserted AND the Enable Drive Line State (ENDLS) bit is set to one, the 14aa1 shall drive the state of the DDLS bit on the TDATA output pin of the device. Note that this mode of operation is not a valid 1394 operating mode and will not allow proper 1394 bus operation if connected to a 1394 bus. It is for diagnostic testing ONLY. The power-up state of this field is 0b. The state of this bit is not affected by bus resets or state machine resets. This bit will be cleared upon HW or SWHRST.

DSLS (1, R/W). Drive Strobe Line State. When the Enable Manufacturing Test Output Drivers (M_TEST) pin is asserted AND the Enable Drive Line State (ENDLS) bit is set to one, the 14aa1 will drive the state of the DSLS bit on the TSTROBE output pin of the device. Note that this mode of operation is not a valid 1394 operating mode and will not allow proper 1394 bus operation if connected to a 1394 bus. It is for diagnostic testing ONLY. The power-up state of this field is 0b. The state of this bit is not affected by bus resets or state machine resets. This bit will be cleared upon HW or SWHRST.

ENDLS (1, R/W). Enable Drive Line State. When the Enable Manufacturing Test Output Drivers (M_EST) pin is asserted AND this bit (ENDLS) bit is set to one, the 14aa1 will drive the state of the DDLS bit on the TDATA output pin of the device, drive the state of the DSLS bit on the TSTROBE output pin of the device. Note that this mode of operation is not a valid 1394 operating mode and will not allow proper 1394 bus operation if connected to a 1394 bus. It is for diagnostic testing ONLY. The power-up state of this field is 0b. The state of this bit is not affected by bus resets or state machine resets. This bit will be cleared upon HW or SWHRST.

TDATA (1, R). Transmitted Data line state. When the Enhanced (E) bit is one, the line state read from this field is valid. This bit reads 37 1" for a data bit 37 1" (logical "1") being transmitted by the 14aa1 and "0" for a data bit "0"(logical "0"). The power-up state of this field is 0b. This bit is updated on a "best effort" basis. It is not required to be toggled with every change of its namesake's input pin. As a goal it shall be updated at least every 9 SCLKs, the length of the register read LREQ.

TSTRB (1, R). Transmitted Strobe line state. When the Enhanced (E) bit is one, the line state read from this field is valid. This bit reads 37 1" for a strobe line "1" (logical "1") transmitted by the 14aa1 and "0" for a strobe line "0" (logical "0"). The power-up state of this field is 0b. This bit is updated on a "best effort" basis. It is not required to be toggled with every change of its namesake's input pin. As a goal it shall be updated at least every 9 SCLKs, the length of the register read LREQ.

TDOE* (1, R). Current state of Tri-state output enable pin. When the Enhanced (E) bit is one, the state read from this field is valid. The power-up state of this field is 0b. This bit is updated on a "best effort" basis. It is not required to be toggled with every change of its namesake's input pin. As a goal it shall be updated at least every 9 SCLKs, the length of the register read LREQ.

OCDOE* (1, R). Current state of Open Collector output enable pin the Enhanced (E) bit is one, the state read from this field is valid. The power-up state of this field is 0b. This bit is updated on a "best effort" basis. It is not required to be toggled with every change of its namesake's input pin. As a goal it shall be updated at least every 9 SCLKs, the length of the register read LREQ.

EBLREQ (1, R/W). Enable Backplane LREQ. When this bit is set to one the 14aa1 shall interpret all bus request LREQs from the link as being 11 bits long in the backplane format. The power-up state of this field is 0b. The state after a HW or a SWHRST reset shall be the value of the EBLREQ pin on the device, if this pin exists. When this bit is set to "0" the 14xx01 shall interpret the bus request LREQs as being 7 bits long (standard cable LREQs). Note that the value of this bit must match the value of its corresponding bit in the attached link layer or the node will not function. For this reason a pin could be provided on both link and PHY to set the type of LREQ in hardware. If the hardware is not set correctly this bit may be changed to change how the 14xx01 interprets bus request LREQs. The state of this bit is not affected by bus resets or state machine resets. This bit will be cleared upon HW or SWHRST and reinitialized to the value of the EBLREQ pin if it exists. In future parts this bit may be moved to the control register (0001).

IRBR (1, R/W). Initiate Robust Bus Reset. When the bit is written to, the PHY will initiate a bus reset in a more robust fashion than what is implemented by the previous IBR bit. Initiation of the bus reset may be delayed relative to the IBR but the duration of the bus reset is the same. It works equally well for open collector transceivers or three state transceivers. This bit is self-clearing. The power-up state of this field is 0b. In future parts this bit may be moved to the control register (0001).

SMRST (1, R/W). Initiate State Machine Reset. When the bit is written to, the PHY shall first clear then reset all state machines in the PHY. This bit is self-clearing. The power-up state of this field is 0b. In future parts this bit may be moved to the control register (0001). SWHRST (1, R/W). Soft Ware Initiated Hard Reset. When this bit is set to one the 14aa1 shall perform a reset of the same nature as the reset caused by toggling the /RESET pin on the device. This shall clear all state machines and register settings to their power on reset states. This bit is self-clearing. The power-up state of this field is 0b. In future parts this bit may be moved to the control register (0001).

LAST_ARB_WON_PRIORITY (4, R). Priority Code of Physical layer Node that Last Won Arbitration. This field shall contain the priority used by the node that last won the arbitration process on the bus. This field is only valid when the E bit is one 37 1". This field is supplied for system debug purposes. The power-up state of this field is 0000b. In future parts this bit may be moved to the control register (0001). This bit may be moved to the priority register (0101).

STPCLK (1, R/W). Stop PHY supplied SCLK. When this bit is written to, the PHY shall pause, then disable the PHY-Link interface just as if the LPS pin had been taken low. The PHY shall ignore the static value of the LPS input if this bit is set. However, if the LPS input pin makes a low to high transition, the STPCLK bit will be reset to 0 and the PHY-Link interface will be fully operational after its normal initialization. This bit will be reset to 0 and the PHY-Link interface will be fully operational after its normal initialization upon receipt of a Link-On packet. However, since utilization of this bit presupposes the link can not handle LinkON and probably does not even utilize LPS, if the STPCLK bit is set the PHY shall NOT turn on the Link-On hardware clock signal upon receipt of a LinkON packet. This is to prevent LinkON from being permanently "on", wasting power and introducing EMI. The only time software shall utilize this bit shall be when the attached link has not made provision for a LPS pin controlled by a clock other than SCLK. If the link possesses a non-SCLK controlled LPS pin, the LPS pin is the preferred means of managing node power. The power-up state of this field is 0b. In future parts this bit may be moved to the control register (0001).

Table 1 and Table 2 show the register sets of two versions of a physical layer controller. One of the goals of a systems engineer is to know which version of the device is included in a specific system. For example, it is more cost effective to write a single piece of software that can be used with both devices as opposed to two pieces of software. This is especially important for a single system that includes both first and second version devices.

To differentiate between devices of different versions, the present invention takes advantage of a characteristic of the device of Table 1. In particular, this version device only decodes one bit to determine the register that is being addressed. To add additional features, additional registers should be created in a manner that is software compatible to the earlier version of the device. This means that the same decoding scheme will be supported. It is also desirable to make the register set as close to the older 1394–1995 and the newer 1394a PHYs as is practical.

As noted above, the earlier version device uses a unique decoding scheme. When a four bit address is provided to the register set, the contents of the registers will be returned in the following manner.

When register 0000 is read, register 0000 is returned.
When register 0001 is read, register 0001 is returned.
When register 0010 is read, register 0000 is returned.
When register 0011 is read, register 0001 is returned.
When register 0100 is read, register 0100 is returned.
When register 0101 is read, register 0001 is returned.
When register 0110 is read, register 0100 is returned.
When register 0111 is read, register 0001 is returned.
When writing, only writes to the correct register are allowed.

In other words, only one address bit was coded for each register available in the first version device. In the later version device, as shown in Table 2, the register fields for addresses 0010, 0011, 0101, 0110, 0111 were chosen to be compatible with existing software, i.e., software written to be used with the original device.

Unlike the original device, however, the new register set includes the E bit in register 0010.

This bit will always be read as 00 in an older version device. This is true because a read to register 0010 will return bits from register 0000 and these particular bits were reserved, that is always "0". In the new version device, one or both of these bits will be permanently set to "1". This characteristic allows software to distinguish between a first version device and a second version device and therefore determine whether the data in the other fields is valid or invalid. Since the registers that exist in the earlier version device still exist in the newer device with the same addresses and the same fields, the newer device is backwards compatible with the older device.

It is noted that the Enhanced bit could have been placed in another location that meets the same criteria of backward compatibility. For example, when register 0111 is read in an older version device, the register 0001 is returned. Since the last six bits of the older version register 0001 are reserved, any of the last six bits of register 0111 could have been used to store the Enhanced bit and/or the LSME bit. Accessibility by the later devices and the ability to be added to the original device datasheet with no changes to the device are factors that are considered when choosing the location of the Enhanced bit.

It is further noted that the present invention is not limited to physical layer controllers. Other devices that have the same types of decoding and compatibility issues could also utilize the inventive concepts of the present invention.

The physical layer controller of the present invention can be used in a variety of systems. One such example is in a wireless base station where the 1394 bus is used to supplement a parallel bus. For example, this bus can be used for initial test and as a backup bus.

Figure 2:
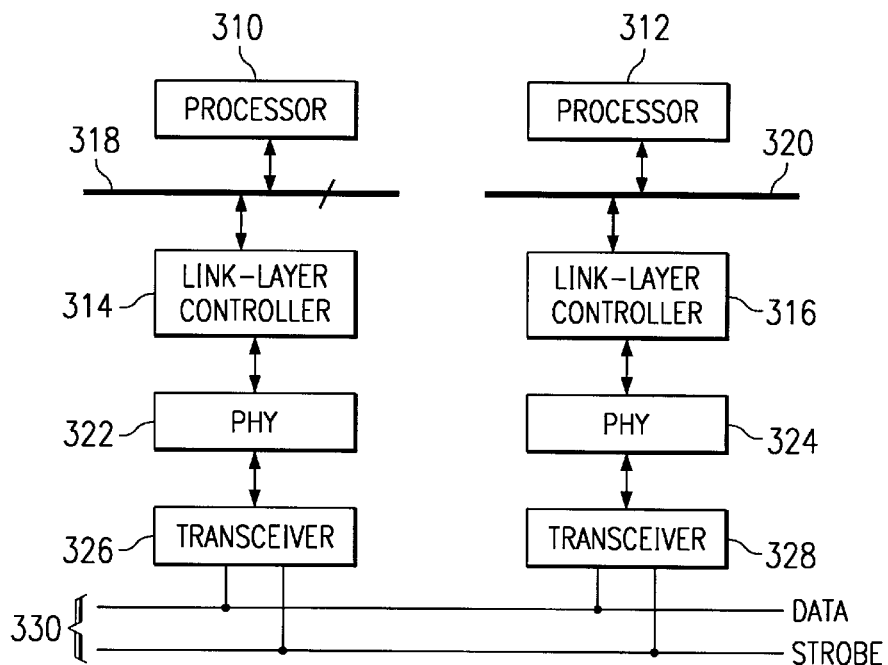
FIG. 2 is a block diagram of a system utilizing at least one 1394 backplane physical layer controller of the present invention.
Figure 3A:
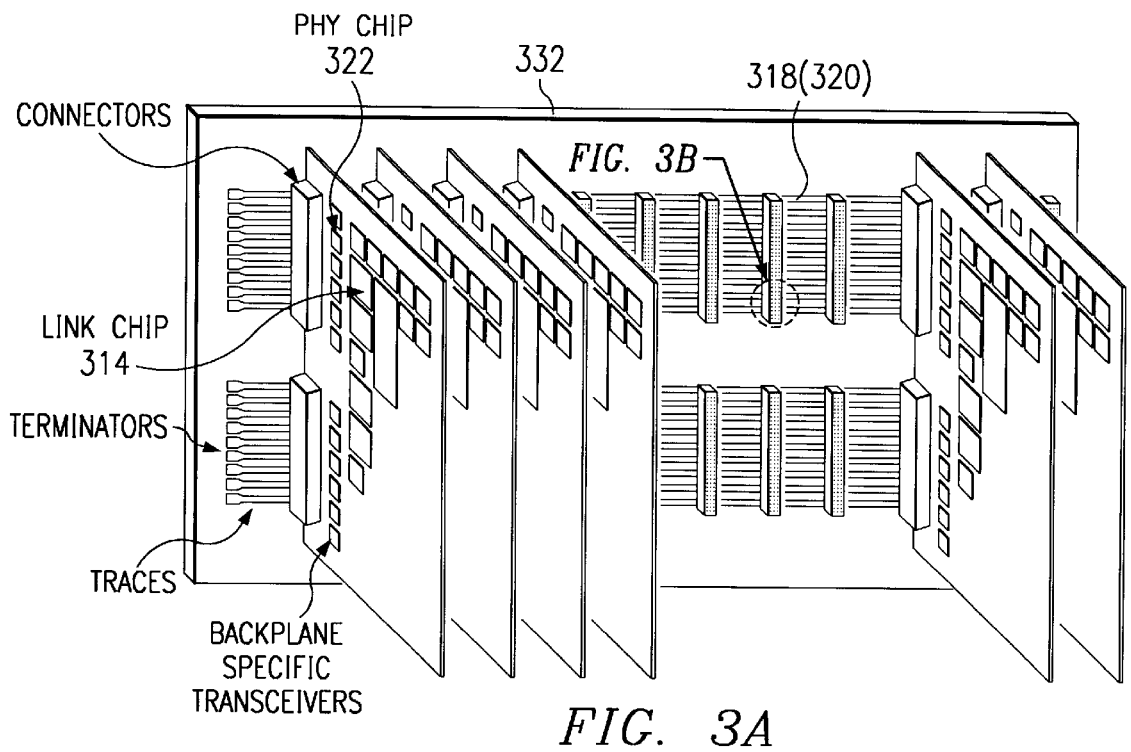
FIGS. 3A and 3B show a physical implementation of a system of the present invention.
Figure 3B:
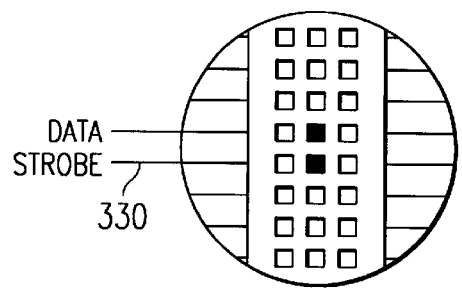

FIG. 2 shows a block diagram of a simplified system and FIG. 3 shows the physical layout of the system. A processor 310 is coupled to link layer controller 314 through a bus 318. As examples, bus 318 may comprises a PCI bus, a processor data bus or another specialized bus. The processor 310 (312) may comprise a microprocessor, a digital signal processor or any other processor or controller that is used in the application. Link layer controller 316 is also coupled to a processor, which may be a different processor 312 (as shown in the figure) or the same processor 310, depending upon the application.

Each link layer controller 314 (316) is coupled to a respective physical layer controller 322 (324). In the preferred embodiment, both physical layer controllers 322 and 324 are newer version devices that include the Enhanced bit(s) as described herein. In the preferred embodiment, the first physical layer controller 322 includes a register set with a plurality of eight-bit registers addressable by four-bit addresses, wherein either or both of the seventh and eighth bits (i.e., bits 6 and 7) of the register 0010 is permanently programmed with a logical "1".

As shown in the figure, the physical layer controllers 314 and 316 are coupled to transceivers 326 and 328 which are in turn coupled to serial bus 330. Consistent with the 1394 specification, the serial bus 330 includes a data line and a strobe line. This bus can be arbitrated asynchronously or isochronously, depending upon the application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of determining whether a semiconductor device comprises a first version device or a second version device, both the first version device and the second version device including a register set with a plurality of registers, in the first version device a first one of the registers being accessible by a first address and including at least one reserved bit in a reserved bit location, the first version device further being decoded such that reading from a second address that is different than the first address will nonetheless cause reading from the first one of the registers, the method comprising:
   providing the second address to the register set;
   reading at least one bit from the reserve bit location; and
   if said at least one bit is a logical "1", determining that the semiconductor device comprises a second version device.

2. The method of claim 1 and further comprising determining that the semiconductor device comprises a first version device if said at least one bit is a logical "0".

3. The method of claim 1 wherein the semiconductor device comprises a backplane physical layer controller.

4. The method of claim 3 wherein the first version physical layer controller is compliant with IEEE-Std-1394-1995.

5. The method of claim 4 wherein the second version physical layer controller is backward compatible with the first version physical layer controller.

6. The method of claim 1 wherein the first and second addresses comprises four bit addresses.

7. The method of claim 6 wherein the first address is "0000" and the second address is "0100".

8. The method of claim 6 wherein the register set comprises a plurality of eight-bit registers and wherein the reserved bit location is the eighth bit location.

9. The method of claim 6 wherein the register set comprises a plurality of eight-bit registers and wherein the reserved bit location is the seventh bit location.

10. The method of claim 6 wherein the register set comprises a plurality of eight-bit registers and wherein the reserved bit location is the location of the seventh and eighth bits, wherein it is determined that the semiconductor device comprises a second version device if the eighth bit is a logical "1".

11. A method of determining whether a 1394 serial bus backplane physical layer controller comprises a first version controller or a second version controller, both the first version controller and the second version controller device including a register set with a plurality of eight-bit registers, wherein the first version controller includes reserved bits in the seventh and eighth bits of the register addressed by address "0000", the first version controller further being decoded such that reading from a "0010" address will nonetheless cause reading from the register addressed by address "0000", the method comprising:
   providing the address "0010" to the register set;
   reading a bit from at least one of the seventh and eighth bits; and
   if the bit read is a logical "1", determining that the serial bus physical layer controller comprises a second version controller.

12. A serial bus backplane physical layer controller comprising:
   digital interface circuitry;
   serial bus interface circuitry coupled to receive data from the digital interface circuitry, the digital interface circuitry and the serial bus interface circuitry configured to be backward compatible with a serial bus physical layer controller that complies with IEEE-Std-1394-1995;
   register decode circuitry including a plurality of address bit inputs, the decode circuitry to receive four-bit address data;
   a register set including a plurality of eight-bit registers addressable by the four-bit address data, wherein at least one of the seventh or eighth bits of the register addressed by the address "0010" is permanently programmed with a logical 37 1".

13. The controller of claim 12 wherein the seventh bit of the register addressed by the address "0010" is permanently programmed with a logical 37 1".

14. The controller of claim 12 wherein the eighth bit of the register addressed by the address "0010" is permanently programmed with a logical 37 1".

15. The controller of claim 12 wherein both the seventh bit and the eighth bit of the register addressed by the address "0010" is permanently programmed with a logical 37 1".

16. The controller of claim 12 wherein the seventh bit of the register addressed by the address "0000" comprises a cycle master bit, the cycle master bit being readable and writable by system software.

17. A system comprising:
 a serial bus, at least a first portion of the serial bus comprising conductive lines formed on a circuit board;
 a first physical layer controller coupled to the first portion of the serial bus, the first physical layer controller including a register set with a plurality of eight-bit registers addressable by four-bit addresses, wherein at least one of the seventh or eighth bits of the register addressed by the address "0010" is permanently programmed with a logical 37 1", the first physical layer controller being backward compatible with a physical layer controller that conforms with IEEE-Std-1394–1995;
 a first link layer controller coupled to the first physical layer controller;
 a first processor coupled to the first link layer controller,
 a second physical layer controller coupled to the first portion of the serial bus; and
 a second link layer controller coupled to the second physical layer controller.

18. The system of claim 17 wherein the second physical layer controller includes a register set with a plurality of eight-bit registers addressable by four-bit addresses, wherein at least one of the seventh or eighth bits of the register addressed by the address "0010" is permanently programmed with a logical "1".

19. The system of claim 17 and further comprising a second processor coupled to the second link layer controller.

20. The system of claim 17 wherein the first processor is further coupled to the second link layer controller.

21. The system of claim 17 wherein the first processor comprises a digital signal processor.

22. The system of claim 17 wherein the serial bus comprises a bus system of a wireless base station.

* * * * *